Dec. 12, 1939.  V. H. MATTHEWS  2,182,927
LIQUID DISTRIBUTING DEVICE
Filed July 6, 1938  2 Sheets-Sheet 1

INVENTOR.
VINTON H. MATTHEWS.
BY Philip A. Minnis
ATTORNEY.

Dec. 12, 1939.  V. H. MATTHEWS  2,182,927
LIQUID DISTRIBUTING DEVICE
Filed July 6, 1938   2 Sheets-Sheet 2
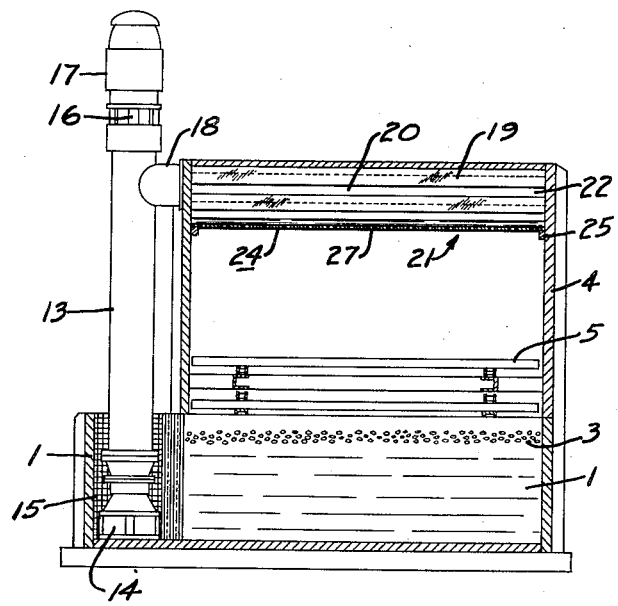
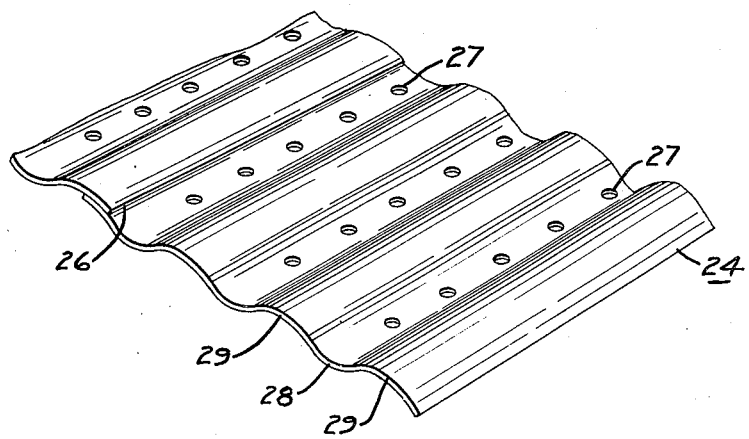
INVENTOR.
VINTON H. MATTHEWS.
BY Philip A. Minnis
ATTORNEY.

Patented Dec. 12, 1939

2,182,927

UNITED STATES PATENT OFFICE 2,182,927

LIQUID DISTRIBUTING DEVICE

Vinton H. Matthews, San Jose, Calif., assignor to Food Machinery Corporation, San Jose, Calif., a corporation of Delaware Application July 6, 1938, Serial No. 217,655

4 Claims. (Cl. 299—58)

This invention relates to apparatus for washing, cooling or otherwise treating fruits, vegetables or other products with treating liquids, and is more particularly concerned with the provision of improved liquid distributing means for the distribution and application of the treating liquid in such apparatus.

A typical form of apparatus in which the present invention may be used to advantage, is the precooling apparatus illustrated and described in the copending application filed by Roy M. Magnuson Ser. No. 179,538 filed December 13, 1937, and although, as will hereinafter become apparent, the invention is likewise applicable to other types of apparatus as well, I shall, for purposes of convenience, disclose and describe the same as it may be applied to the precooling apparatus referred to.

In the operation of such precoolers the product to be cooled is conveyed beneath a liquid distributing tank into which the chilled cooling liquid is pumped and from which the liquid is deluged onto the product through suitably arranged apertures in the bottom of the tank. The liquid, after flowing over the product, falls into a chilling tank where it is re-chilled and again pumped into the distributing tank for re-application to the product.

Uniformity of distribution of the cooling liquid in sufficient quantities over the entire area of the conveyer upon which the product is conveyed through the machine, has an important bearing upon the efficiency of the treatment, since obviously it is desirable that all of the product be sufficiently as well as uniformly treated. It is likewise desirable that the proper distribution and application of the liquid be accomplished with a minimum of power consumption as well as a minimum total quantity of liquid.

It is one of the principal objects of this invention to provide an improved form of liquid distributing means suitable for use in such machines, and which is capable of effecting a more uniform distribution and application of the liquid over a given area than has heretofore been obtainable.

It is also an object to provide such a liquid distributing means which is operable to uniformly distribute and discharge the liquid under a minimum and uniform head.

A further object is to provide a liquid distributing device in which clogging of the discharge outlets is minimized.

Another object is to provide a liquid distributing device which is strong, durable, simple and inexpensive.

Further objects and advantages will best be recognized and understood from the following description of an illustrative embodiment, taken in connection with the accompanying drawings thereof, wherein, Fig. 1 is a longitudinal sectional elevation of a precooler embodying the invention.

Fig. 2 is a transverse sectional elevation of the same as viewed along the line 2—2 of Fig. 1.

Fig. 3 is an enlarged perspective view of a section of the distributor plate.

Figure 1:
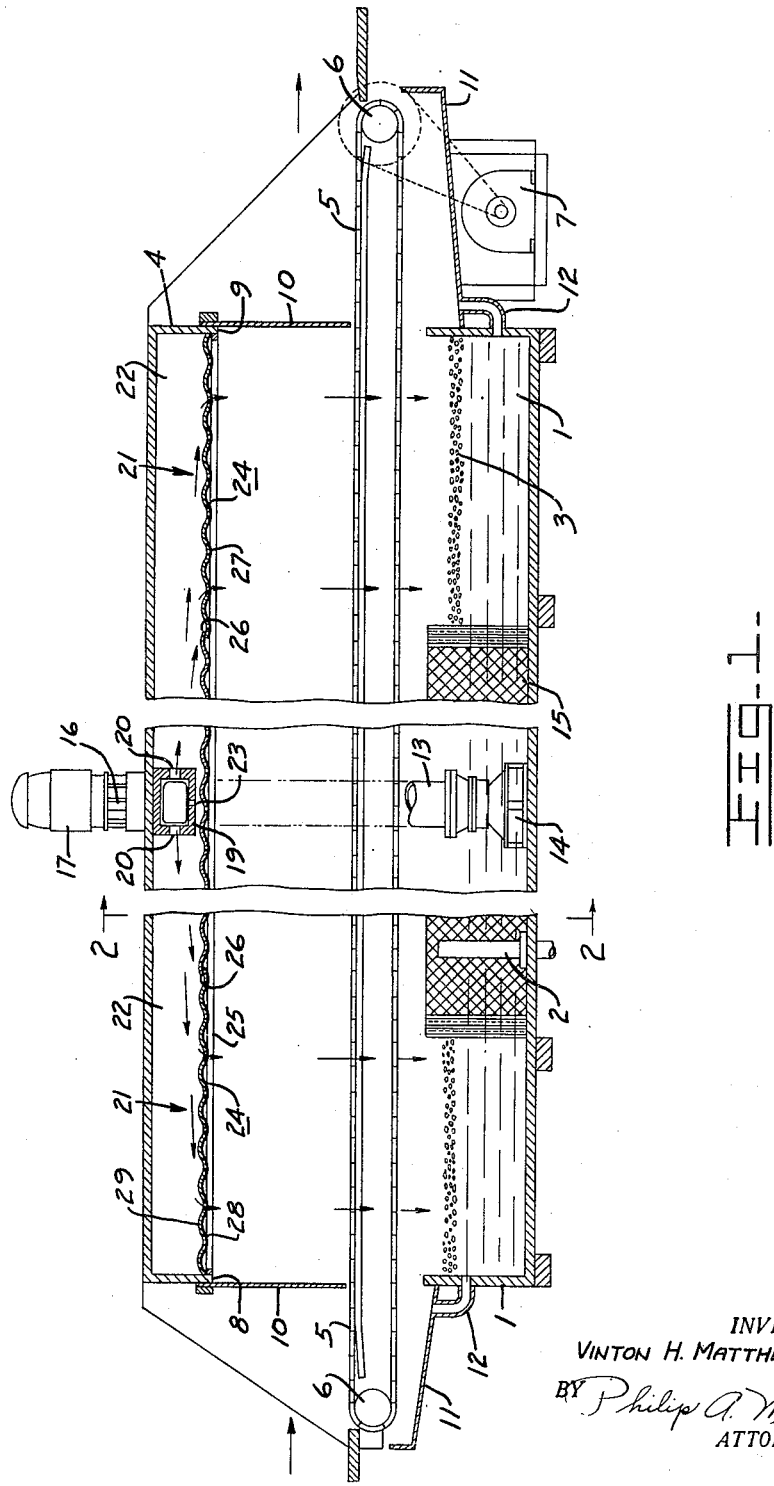

The precooler illustrated is of similar construction to that disclosed in the copending application above referred to, except for the modifications embodying the present invention so that only so much of the machine will be described as is deemed necessary for a full understanding of this invention, reference being made to said application for other details of construction and operation with which the present invention is not directly concerned.

Generally described, the machine illustrated comprises a main tank 1, containing a body of cooling liquid up to the level determined by the height of the overflow pipe 2, the water being kept supplied with cracked ice 3 in sufficient quantities to keep its temperature down to the desired degree. Above the tank 1 is mounted an inverted box-like housing 4 of somewhat smaller width than the tank so that the latter projects outwardly from beneath the housing to one side thereof.

The product to be cooled is advanced through the housing, either in bulk or in crates, as may be desired, by means of an endless conveyer 5 running over pulleys 6 and driven by an electric motor 7. The conveyer projects beyond the ends of the housing to facilitate delivery and removal of the product therefrom, and the housing is provided with inlet and exit openings 8 and 9, respectively, covered with hanging flexible curtains 10 which normally close the openings but admit of entrance and exit of the product carried on the conveyer. Drip pans 11 extend beneath the outwardly projecting ends of the conveyer and are connected with the tank 1 by means of drain pipes 12 which serve to permit the drip from the conveyer to return to the main tank.

During progress of the product through the machine, it is continuously deluged with cooling liquid discharged above the product from a liquid distributing device shortly to be described. The cooling liquid is supplied to the distributing device by means of a vertical stand pipe 13 extending into the offset portion of the tank 1 and having an inlet 14 surrounded by a screen 15 which prevents the entry of ice or debris into the pipe. A small turbine pump (not shown) mounted in the lower portion of the stand pipe 13 is driven from a vertical drive shaft 16 by means of an electric motor 17 mounted above the upper closed end of the pipe, and serves to pump the cooling liquid from the tank 1 up through the stand pipe 13 and discharge it through an elbow 18 into a rectangular box-like discharge header 19 extending transversely of the housing. The header 19 is provided with a pair of longitudinally extending slot-like discharge openings 20 which serve to discharge the cooling liquid towards opposite ends of the machine over a perforated flooring, generally indicated at 21, which extends across the entire width of the housing from end to end thereof, and cooperates with the housing to provide a shallow distributor tank 22 of which the flooring forms the bottom. A third slot 23 in the bottom of the header serves to supply liquid to the area of the flooring immediately beneath the header which would not otherwise receive an adequate supply.

In conformity with the present invention, the upper surface of the flooring 21 is of corrugated conformation, with the corrugations extending crosswise of the housing, and it may conveniently be made up of a plate or plates 24 of conventional corrugated galvanized sheet iron, resting upon ledges 25 secured to the inside of the housing 4. Preferably, for convenience in assembly and to permit ready removal for access to the interior of the housing, or for cleaning or replacement purposes, the flooring is composed of a series of sections arranged with their ends in overlapping relation as illustrated, the laps being arranged so that the upper exposed end edges 26 of the plates face away from the header 19 whereby they do not interfere with the flow of liquid across the corrugations. It will be understood that in machines where corrosive chemical solutions are used, the plates may be suitably coated or made of other materials which are non-corrosive.

The plates 24 are provided with rows of holes or perforations 27 formed in the bottoms of the valleys 28 between the intermediate convex corrugations 29, and these perforations permit the discharge of the cooling liquid therethrough and onto the product moving along on the conveyer therebeneath, the liquid thence falling into the tank 1 for re-cooling and re-circulation. It will be apparent that the form, size and spacing of the perforations may be selected to suit the particular operative requirements and conditions to be met with, but as an illustrative example I have found that, for use in the precooler illustrated, circular perforations of approximately ¼ inch diameter and spaced approximately 1 inch apart from center to center, give excellent results. It will be understood that where sheets of liquid are desired rather than cylindrical jets, the perforations may be made in the form of rectangular slots extending parallel with the corrugations.

In operation, the liquid discharged from the header slots 20 flows across the plates 24 towards the ends of the machine to build up a shallow head of flowing liquid, and I have found that with the corrugated conformation of the distributor plates as illustrated, the liquid is effectively distributed over the entire area of the plates, and that substantially uniform and uninterrupted streams of liquid are discharged from the perforations 27. This appears to be due to the fact that the smoothly undulating curvilinear conformation of the corrugations offers a minimum of obstruction to the flow of liquid thereacross so that the liquid may not only readily flow entirely across the plates, but may do so with a minimum of agitation. At the same time, the valleys between the convex corrugations 29 form comparatively static, and more or less isolated pools of liquid, as compared with the main current flowing across the corrugations, so that the change in direction of flow of the liquid from the horizontal stream across the plates, to the vertical streams discharging through the perforations 27, is not excessively abrupt, and agitation at these points is minimized. Moreover, the perforations being in the bottoms of the valleys, there is no flow of liquid directly across them tending to suck up air therethrough and break up the continuity of the discharging streams.

It will be apparent, therefore, from the foregoing, that the liquid distributing device of the present invention serves to distribute and discharge the liquid substantially uniformly and uninterruptedly over its entire area, whereby the product passing therebeneath is adequately and uniformly treated. Furthermore, only a minimum quantity of liquid is required since it is unnecessary to supply excessively large volumes of liquid from the header 19 in order to insure that an adequate supply of liquid will reach the far ends of the machine. Consequently the power consumption is minimized as well as the cost of cooling the liquid.

It will also be observed that the corrugated construction of the distributor plates affords no sharp edges or corners for leaves or other debris which may be washed off the product undergoing treatment, to catch upon and clog up the discharge apertures. As a result any such debris will be carried by the liquid to the far ends of the distributing tanks where it will collect and may easily and quickly be removed by reason of its concentration at these definite points.

A further advantage of the corrugated sheet metal construction resides in its inherent mechanical strength which makes it unnecessary to provide transverse supports underneath it and so reduces the clearance required between the conveyer and the distributor plates and consequently the head under which the pump must operate. Thus the construction itself is not only simplified and inexpensive but the cost of operation is likewise reduced.

It will be understood that while I have described my invention as it may be embodied in a precooler for fruits and vegetables, its usefulness is not confined thereto, but extends to various other machines such as may be utilized for deluging articles of any character with a treating liquid. For example, the distributor embodying my invention may be used in fruit washers of the type disclosed in U. S. Letters Patent to A. O. Moe, No. 1,983,478 dated December 1, 1934, and in other machines of similar type, such as may be used for applying mold inhibiting liquids, coloring solutions, or other liquids to fruit, vegetables or other articles. It is therefore to be understood that the scope of my invention extends to all such uses and applications, and I deem myself entitled to the same as well as such variations, modifications and alterations as fall within the spirit and scope of the invention as defined in the claims hereto appended.

I claim:

1. A liquid distributing device comprising a tank having a bottom provided with discharge apertures in lines extending transversely thereof, concave topped riffles extending parallel with and between said lines, and means for discharging liquid into said tank to cause said liquid to flow across the bottom transversely of said riffles.

2. A liquid distributing device comprising a tank provided with a bottom having curvilinear corrugations extending thereacross, discharge apertures in the concavities of the grooves formed between said corrugations, and means for discharging liquid into said tank transversely of said corrugations.

3. A liquid distributing device comprising a tank having a bottom formed of curvilinearly corrugated sheet metal, said tank bottom being provided with discharge apertures in the valleys formed between intervening corrugations, and means for discharging liquid into said tank to cause said liquid to flow across the bottom transversely of said corrugations.

4. A liquid distributing device comprising a tank having a bottom formed of thin sheet metal, said tank bottom being provided with discharge apertures in lines extending transversely thereof, concave topped riffles formed on said bottom to extend parallel with and between said lines, and means for discharging liquid into said tank to cause said liquid to flow across the bottom transversely of said riffles.

VINTON H. MATTHEWS.